United States Patent

[11] 3,631,389

[72] Inventor Harold V. Elliott
 Saginaw, Mich.
[21] Appl. No. 28,239
[22] Filed Apr. 17, 1970
[45] Patented Dec. 28, 1971
[73] Assignee General Motors Corporation
 Detroit, Mich.
 Continuation of application Ser. No.
 587,887, Oct. 19, 1966, now abandoned.
 This application Apr. 17, 1970, Ser. No.
 28,239

[54] BRAKE SYSTEM CONDITION WARNING SYSTEM AND SWITCH ASSEMBLY THEREFOR
5 Claims, 3 Drawing Figs.
[52] U.S. Cl.................................................. 340/60,
 200/81.4, 340/52 C, 340/69
[51] Int. Cl....................................................... B60q 1/44,
 B60t 17/22

[50] Field of Search............................................. 188/1 A,
 151 A; 200/81.4, 81.5; 340/52, 59, 60, 66, 69, 71,
 72

[56] References Cited
 UNITED STATES PATENTS
2,332,301 10/1943 Cox.............................. 340/60 UX
3,011,595 12/1961 Heiss et al...................... 340/52 C X

*Primary Examiner*—John W. Caldwell
*Assistant Examiner*—Kenneth N. Leimer
*Attorneys*—W. E. Finken and D. D. McGraw ABSTRACT: A switch assembly having switch sections separately actuated by front and rear brake pressures, and connected in electric circuitry to warn when either system fails to pressurize. The circuitry includes the parking brake warning light and the vehicle stoplights.

PATENTED DEC 28 1971

3,631,389

INVENTOR.
Harold V. Elliott
BY
D. D. McGraw
ATTORNEY

BRAKE SYSTEM CONDITION WARNING SYSTEM AND SWITCH ASSEMBLY THEREFOR

This application is a continuation of application Ser. No. 587,887, filed Oct. 19, 1966, and now abandoned.

The invention relates to a system for providing a warning of the presence or absence of certain conditions in a brake system, and more particularly to such a warning system which is responsive to the presence and absence of fluid pressures in separate fluid pressure circuits of a brake system. The invention further relates to warning system which is also responsive to a brake system condition such as the application and release of a vehicle parking brake portion of an entire vehicle brake system. The invention also relates to a switch assembly for such a warning system, and especially a switch assembly which senses the presence and absence of pressures in separate brake pressure circuits. The warning system includes first and second warning means, with the first warning means being stop lamps which indicate to persons primarily rearwardly of the vehicle that the vehicle brakes are applied or being applied. The second warning means in the warning system when actuated indicates that one of the brake circuits has no pressure therein when the service brake pedal is applied, and, when also connected with the vehicle parking brake, indicates that the parking brake is applied. The warning system may be connected through the vehicle ignition switch.

Figure 1:
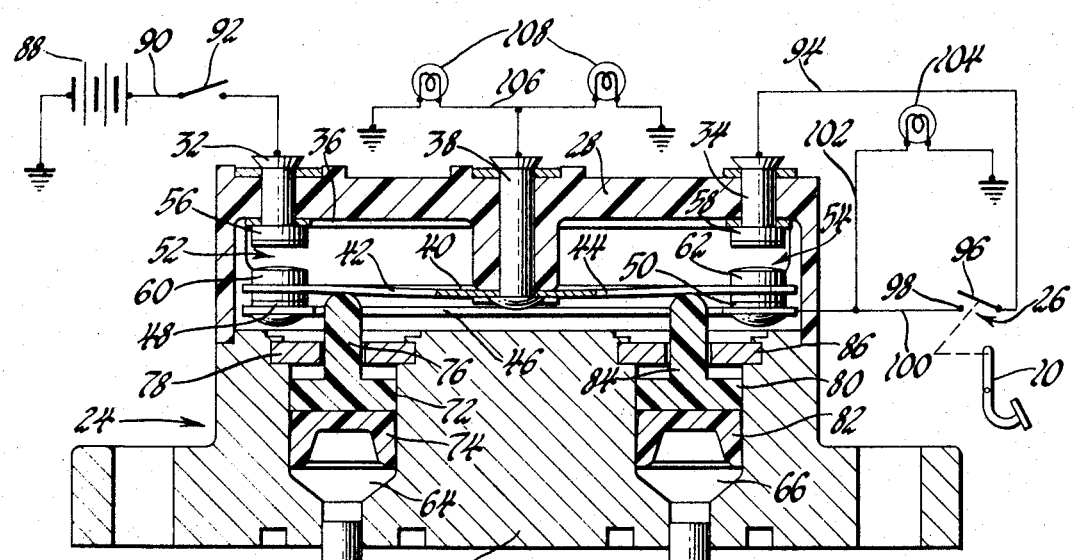
FIG. 1 is a schematic representation of a warning system embodying the invention connected with a vehicle brake system, with the switch assembly which is responsive to fluid pressures being illustrated with parts broken away and in section.

The vehicle brake system shown in FIG. 1 includes a parking brake lever 10 which is suitably connected to apply the parking brake when actuated by the vehicle operator, a service brake lever 12 connected to actuate the master cylinder 14, a first fluid pressure actuated brake circuit 16 connected to brakes such as the front wheel brakes 18, and a second fluid pressure actuated brake circuit 20 connected to brakes such as the rear wheel brakes 22. Since the circuits 16 and 20 are separately pressurized by the master cylinder 14, the master cylinder is of the dual master cylinder type.

A switch assembly 24 is provided as part of the warning system, as is the normally open parking brake switch 26. When the parking brake lever 10 is moved to apply the parking brake, switch 26 is closed. Thus this switch senses the presence and absence of the application of a brake system condition, which is the application or lack of application of the parking brake.

The switch assembly 24 has a housing upper recessed section 28 secured to a housing lower section 30. Terminal posts 32 and 34 are secured in the housing upper section 28 and are electrically connected by suitable means such as the connector strip 36. Terminal post 38 is also mounted in the housing upper section 28 and has the inner end thereof providing a mounting and electrical connection to contact mounting spring 40. Post 38 is connected to the center of spring 40 so that the spring has cantilever arms 42 and 44 extending therefrom. A connector strip 46 is also mounted in the switch assembly housing and provides a base for first contacts 48 and 50, respectively, of switches 52 and 54. Second contacts 56 and 58 are respectively mounted on the inner ends of posts 32 and 34 and also respectively form parts of switches 52 and 54. Third contacts 60 and 62 are respectively mounted on opposite ends of arms 42 and 44 and are double headed in form and also respectively form parts of switches 52 and 54. Contacts 48, 56 and 60 of switch 52 are in alignment, with the spring force or arm 42 of spring 40 biasing contact 60 into engagement with contact 48. Contacts 50, 58 and 62 of switch 54 are similarly arranged, with contact 62 being biased into engagement with contact 50 by the spring force of arm 44.

The switch assembly lower housing section 30 has chambers 64 and 66 formed therein which are respectively fluid connected by conduits 68 and 70 to their respective fluid pressure circuits 16 and 20. A piston 72 is provided with a pressure cup 74 on one end and a plunger 76 on the other end and is reciprocably mounted in chamber 64, being retained therein by retainer 78. Plunger 76 extends through retainer 78 and into engagement with spring arm 42. A similar piston 80 with a cup 82 and a plunger 84 is reciprocably received in chamber 66 and retained therein by retainer 86. Plunger 84 engages spring arm 44. It can be seen that when fluid pressure is applied in chamber 64, for example, plunger 76 is moved upwardly against the biasing force of arm 42 and contact 60 is moved out of engagement with contact 48 and into engagement with contact 56. Similarly, when pressure is applied in chamber 66, plunger 84 is moved upwardly against the biasing force of arm 44 and moves contact 62 out of engagement with contact 50 and into engagement with contact 58.

The warning system electrical circuit includes a source of electrical energy schematically illustrated as a battery 88 connected through electrical lead 90 and ignition switch 92 to post 32 and therefore contacts 56 and 58. Electrical lead 94 connects post 34, and therefore contact 58, with one contact 96 of the parking brake switch 26. The outer parking brake switch contact 98 is connected by electrical lead 100 to connector strip 46 and therefore to contacts 48 and 50. Electrical lead 102 connects with lead 100 and through a warning device, such as warning lamp 104, to ground. Electrical lead 106 connects post 38, and therefore contacts 60 and 62, through spring 40, through a warning device, such as stop lamps 108, to ground.

In the brake system of FIG. 1, there are three brake conditions which are sensed by the sensing means including the switch assembly 24 and the switch 26. One condition is the presence or absence of fluid pressure in circuit 16. Another condition is the presence or absence of fluid pressure in circuit 20. A third condition is the application or release of the vehicle parking brake. When all systems are operating normally, with the ignition switch 92 closed, and all brake systems in the released condition, substantially no fluid pressures exist in circuits 16 and 20 and brake switch 26 is open. The switches of the sensing means are therefore in the positions shown in FIG. 1. If the vehicle service brakes are normally applied by depression of lever 12 and pressurization of circuits 16 and 20 by master cylinder 14, both pistons 72 and 80 will respond to these pressures and both plungers 76 and 84 will move upwardly so that the third contacts 60 and 62 disengage the first contacts 48 and 50 and engage the second contacts 56 and 58, respectively. This will complete an electrical circuit to the stop lamps 108, which operate as first warning means. Although electrical lead 94 is energized, switch 26 is open and therefore the second warning means provided by the warning lamp 104 is not actuated. If, however, either circuit 16 or circuit 20 fails to have fluid pressurized therein, the associated piston and plunger will not move and the associated third contact will not be moved. Should a pressure failure occur in circuit 16, for example, contact 60 will remain in engagement with contact 48. With circuit 20 pressurized, contact 62 will engage contact 58. If the pressure failure is in circuit 20, with circuit 16 being normally pressurized, the reverse will take place. In either instance, the first warning means 108 will be actuated through the sensing manes. However, since contact 60, for example, does not move, contact 48 will also be electrically energized, as will leads 100 and 102 and the second warning means 104. Lamp 104 is positioned in the vehicle as to immediately bring to the attention of the vehicle operator the fact that one of the brake conditions which should have been present upon brake actuation is in fact absent, or vice versa. Since this signal occurred during the actuation of the vehicle service brakes, the operator is immediately warned that one of the service brake circuits has not been pressurized.

When a vehicle is parked with the parking brake applied, the ignition switch 92 is normally open. However, should the operator close the ignition switch as, for example, when preparing to start the vehicle, without releasing the parking brake, the warning lamp 104 will be energized through lead 90, connector strip 36, lead 94, lead 100 and lead 102. Since contacts 60 and 62 are respectively in engagement with contacts 48 and 50, the stop lamps 108 will also be energized through lead 100, spring 40, post 38, and lead 106. This arrangement will also warn persons outside and to the rear of the vehicle that at least a portion of the vehicle brake system is applied. The actuation of the stop lamps while the ignition switch is closed and the parking brake applied will also more clearly bring to the attention of other vehicle operators the presence of the vehicle equipped with this warning system, and that vehicle is probably occupied so that some movement of the vehicle may shortly occur. The stop lamps will remain actuated if the operator also depresses the service brake lever, assuming at least one of the circuits 16 and 20 to be normally pressurized thereby. Since the operator will observe the actuation of warning lamp 104, he will recognize that his parking brake is applied and will release it to open switch 26. The warning lamp 104 and the stop lamps 108 will then be deenergized, assuming the service brakes to be released.

Figure 2:
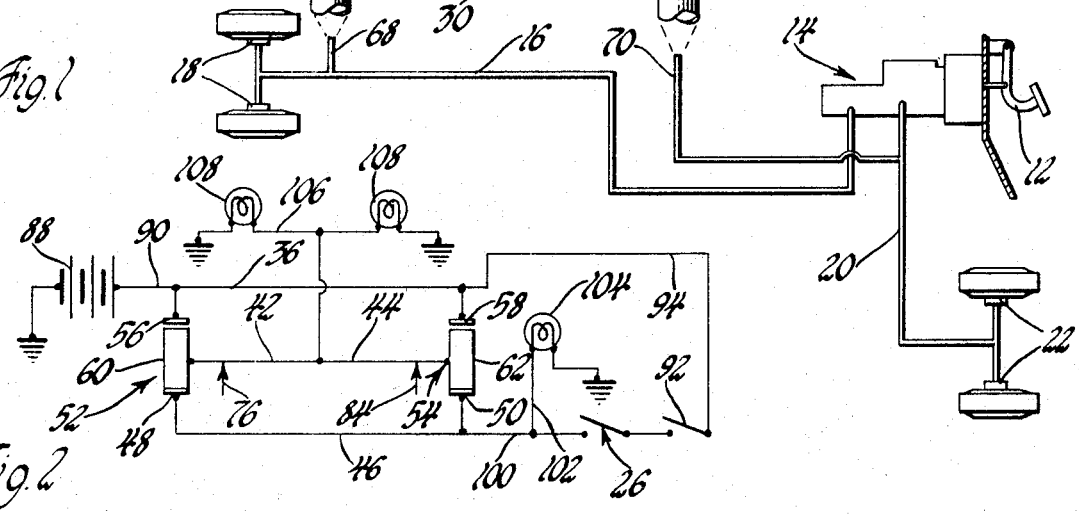
FIG. 2 is a schematic representation of a modified warning system embodying the invention.

The modified system schematically illustrated in FIG. 2 has the ignition switch 92 placed in lead 104 instead of lead 90. This permits the stop lamps 108 to be energized upon pressurization of either of the brake circuits 16 or 20, or both, without the ignition switch being closed. If only one of the brake circuits is pressurized, warning lamp 104 will also be energized even though the ignition switch is open. However, when the parking brake is applied, with switch 26 therefore closed, warning lamp 104 will be actuated because of application of the parking brake only when the ignition switch 92 is closed. Thus the warning lamp 104 will not be actuated during long periods of time while the vehicle parking brakes are applied and the ignition switch is open. It will, however, be immediately actuated whenever the service brakes are applied and one of the circuits fails to generate pressure therein.

Figure 3:
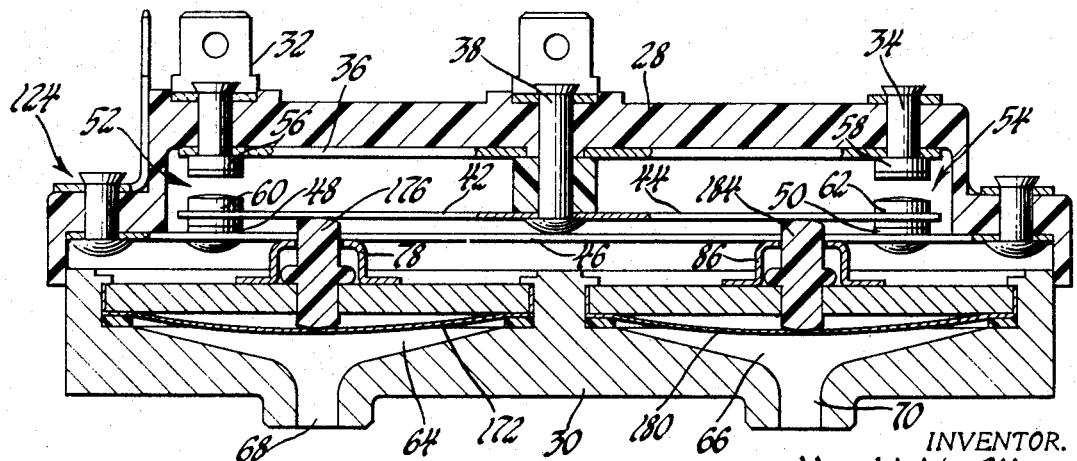
FIG. 3 is a cross-sectional view with parts broken away of a modified pressure-sensing switch assembly.

The modified switch assembly 124 shown in FIG. 3 is similar to switch assembly 24 of FIG. 1, except that a somewhat different arrangement is utilized to respond to pressures in chambers 64 and 66. In this instance flexible diaphragms 172 and 180 respectively seal pressure chambers 64 and 66 at the chamber upper ends and are respectively engaged by plungers 176 and 184. These plungers respectively engage spring arms 42 and 44 and operate in the same manner as described above with regard to switch assembly 24.

A brake condition warning system and a switch assembly for the system has been disclosed which will warn persons of the presence or absence of several brake conditions. The brake condition warning system may be utilized without the parking brake switch portion of the condition-sensing means, or with it. Considering a first brake condition to be the presence of fluid pressure in circuit 16, a second brake condition to be the presence of fluid pressure in circuit 20, and a third brake condition to be the application of the vehicle parking brake, the sensing means including the switch assembly 24 and the switch 26 senses the presence and absence of each of these conditions. If, for example, only the first condition occurs, the first warning means 108 and the second warning means 104 will be actuated through the sensing means, If only the second brake system condition occurs, the first and second warning means will both be energized. If only the third brake system condition occurs, both the first and second warning means will be actuated. If the first and third brake system conditions are present and the second brake system condition is absent, both the first and second warning means will be actuated through the sensing means. If the second and third brake system conditions are present and the first brake condition is absent, both the first and second warning means will be actuated through the sensing means. If the first and second brake conditions are present and the third brake condition is absent, only the first warning means will be actuated. The above situations are all predicated on the fact that the ignition switch 92 is closed, in the system of FIG. 1. When the ignition switch 92 is open in the system of FIG. 1, neither of the warning means may be energized. However, when the ignition switch 92 is open in the system of FIG. 2, the stop lamps 108 and the warning lamp 104 are energized if the service brakes are applied and only one of the first and second brake conditions is present. When both the first and second brake conditions are present, only the stop lamps 108 will be energized. The first and second warning means will not be energized due to the presence of only the third condition unless ignition switch 92 is closed.

What is claimed is:

1. A brake system condition warning system comprising:

first and second and third brake system condition sensors respectively sensing the presence and absence of first and second and third brake system conditions, first warning means actuated through at least one of said first and second sensors by the presence of at least one brake condition sensed by at least one of said first and second sensors, and second warning means actuated through a series connection formed through said first and second sensors by the presence of one and the absence of the other of said first and second brake conditions sensed by said first and second sensors, said second warning means also being actuated through said third sensor by the presence of said third brake system condition irrespective of said first and second brake system conditions.

2. The brake system condition warning system of claim 1, said first brake system condition being the brake-actuating pressurization of a first fluid pressure actuated brake system circuit system in the brake system, said second brake system condition being the brake-actuating pressurization of a second fluid pressure actuated brake circuit in the brake system, and said third brake system condition being the application of a parking brake.

3. The brake system condition warning system of claim 2, said first and second and third sensors respectively comprising first and second and third switches, each of said first and second switches having first and second and third contacts and means biasing said third contact into engagement with said first contact and pressure-responsive means fluid connected with a fluid pressure actuated brake circuit and actuable upon pressurization of the associated fluid pressure actuated brake circuit to move said third contact from engagement with said first contact to engagement with said second contact, said third switch being a normally open switch and having fourth and fifth contacts closed by application of a parking brake.

4. The brake system condition warning system of claim 3, further comprising:

a source of electrical energy and means connecting said second and fourth contacts thereto, means connecting said third contacts to said first warning means, and means connecting said first and fifth contacts to said second warning means.

5. In a vehicle having first and second fluidly independent hydraulic brake circuits and means for pressurizing each circuit to actuate vehicle brakes, a vehicle multiple hydraulic brake circuit condition indicating system comprising a combination:

a hydraulic circuit condition sensing assembly for sensing hydraulic fluid pressure conditions of each of said hydraulic circuits, the conditions being sensed being the presence and absence of predetermined hydraulic pressures in each of said hydraulic circuits when said pressurizing means are actuated, said sensing assembly comprising for each of said hydraulic circuits connected thereto:

a hydraulic pressure responsive displacement member, means biasing said displacement member against hydraulic pressure in the hydraulic circuit connected thereto and being overcome at a predetermined minimum hydraulic pressure in the hydraulic circuit connected thereto and permitting displacement of said displacement member, a switch having first and second and third electrical contacts in aligned relation, said first and third contacts being spaced apart and receiving said second contact therebetween for displaceable movement between positions in which said second contact electrically engages said first contact, said second contact is electrically disengaged from said first and third contacts, and said second contact is electrically engaged with said third contact, said second contact being connected with said biasing means and being biased thereby into electrical engagement with said first contact, and being operatively connected to said displacement member to be moved out of electrical engagement with said first contact upon the displacement of said displacement member by the predetermined minimum pressure in said hydraulic circuit connected thereto, and being thereafter moved into electrical engagement with said third contact at a predetermined higher pressure in the hydraulic circuit connected thereto which causes further displacement of said displacement member against said biasing means, said biasing means returning said second electrical contact from electrical engagement with said third contact to electrical engagement with said first contact and returning said displacement member to its predisplaced position upon the decrease of hydraulic pressure in the hydraulic circuit connected thereto below said predetermined minimum hydraulic pressure;

a vehicle brake having brake apply and release conditions independent of said hydraulic circuit conditions and being indicated by an operator-controlled switch which is open when the brake is released and is closed when the brake is applied;

said sensing assembly having each of said first contacts for each of said hydraulic circuits electrically connected and each of said second contacts for each of said hydraulic circuits electrically connected and each of said third contacts for each of said hydraulic circuits electrically connected;

first and second electrically energizable indicators;

and a source of electrical energy having an electrical ground and an electrical energy output, said output being electrically connected to said third contacts and through said operator-controlled switch and through said first electrically energizable indicator to electrical ground;

said second electrically energizable indicator having said second contacts electrically connected therethrough to electrical ground;

said first contacts being electrically connected through said first electrically energizable indicator to electrical ground.

* * * * *